(12) United States Patent
Xu et al.

(10) Patent No.: US 6,718,282 B1
(45) Date of Patent: Apr. 6, 2004

(54) FAULT TOLERANT CLIENT-SERVER ENVIRONMENT

(75) Inventors: Xi Xu, San Jose, CA (US); Shuxian Lou, San Jose, CA (US); Shujin Zhang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/421,753

(22) Filed: Oct. 20, 1999

(51) Int. Cl.[7] .......................... G06F 11/30; G06F 15/00
(52) U.S. Cl. .................................................. 702/182
(58) Field of Search .......................... 702/188, 108, 702/122, 176, 177, 182; 709/224, 221, 223, 229

(56) References Cited

U.S. PATENT DOCUMENTS

| | | | |
|---|---|---|---|
| 4,397,020 A | | 8/1983 | Howson |
| 5,226,120 A | | 7/1993 | Brown et al. |
| 5,276,801 A | | 1/1994 | Heyen et al. ................ 395/162 |
| 5,471,488 A | * | 11/1995 | Bender ......................... 714/55 |
| 5,555,377 A | * | 9/1996 | Christensen et al. ........ 709/247 |
| 5,581,478 A | | 12/1996 | Cruse et al. |
| 5,671,354 A | | 9/1997 | Ito et al. |
| 5,715,394 A | | 2/1998 | Jabs ....................... 395/200.11 |
| 5,717,604 A | | 2/1998 | Wiggins |
| 5,787,253 A | | 7/1998 | McCreery et al. |
| 5,790,398 A | * | 8/1998 | Horie ............................. 700/4 |
| 5,802,042 A | | 9/1998 | Natarajan et al. |
| 5,812,529 A | | 9/1998 | Czarnik et al. .............. 370/245 |
| 5,835,481 A | | 11/1998 | Akyol et al. |
| 5,922,051 A | | 7/1999 | Sidey |
| 5,926,829 A | * | 7/1999 | Hagersten et al. .......... 711/120 |
| 5,963,540 A | * | 10/1999 | Bhaskaran ................... 370/218 |
| 5,987,232 A | | 11/1999 | Tabuki |
| 5,987,234 A | * | 11/1999 | Hirosawa et al. |
| 5,991,810 A | | 11/1999 | Shapiro et al. |
| 6,002,671 A | * | 12/1999 | Kahkoska et al. ........... 370/248 |
| 6,003,079 A | * | 12/1999 | Friedrich et al. ............ 709/224 |
| 6,018,619 A | | 1/2000 | Allard et al. |
| 6,023,724 A | | 2/2000 | Bhatia et al. |
| 6,026,440 A | | 2/2000 | Shrader et al. |
| 6,047,376 A | | 4/2000 | Hosoe |
| 6,108,736 A | * | 8/2000 | Bell ............................ 710/107 |
| 6,125,397 A | * | 9/2000 | Yoshimura et al. .......... 709/235 |
| 6,134,617 A | * | 10/2000 | Weber ......................... 710/105 |
| 6,144,991 A | * | 11/2000 | England ...................... 709/205 |
| 6,247,050 B1 | * | 6/2001 | Tso et al. .................... 709/224 |
| 6,292,905 B1 | * | 9/2001 | Wallach et al. ................. 714/4 |
| 6,308,238 B1 | * | 10/2001 | Smith et al. ................. 710/129 |
| 6,339,824 B1 | * | 1/2002 | Smith, Sr. et al. ........... 713/157 |
| 6,434,117 B1 | * | 8/2002 | Momona ..................... 370/236 |
| 6,442,165 B1 | * | 8/2002 | Sitaraman et al. ........ 370/395.4 |

FOREIGN PATENT DOCUMENTS

| | | | | |
|---|---|---|---|---|
| WO | WO 93/07569 | 4/1993 | ........... G06F/13/40 |
| WO | 97/13382 | 4/1997 | ........... H04Q/7/22 |
| WO | 99/53408 | 10/1999 | ........... G06F/15/16 |

* cited by examiner

*Primary Examiner*—John Barlow
*Assistant Examiner*—Demetrius Pretlow
(74) *Attorney, Agent, or Firm*—Thelen Reid & Priest, LLP; John P. Schaub (57) ABSTRACT

A method for determining the performance of a first processor in a computer network in which the first processor is connected to a second processor includes incrementing a request count when the second processor requests data from the first processor, incrementing a reply count when the second processor receives data from the first processor, dividing the reply count by the request count to create a ratio and indicating the performance of the first processor is less than expected when the ratio is less than a threshold. An apparatus for determining the performance of a first processor includes at least one memory having program instructions and at least one processor coupled to the first processor. The at least one processor is configured to increment a request count when the at least one processor requests data from the first processor, determine the performance of the first processor based upon a reply count and the request count and increment the reply count when the second processor receives data from the first processor.

51 Claims, 7 Drawing Sheets

FAULT TOLERANT CLIENT-SERVER ENVIRONMENT

BACKGROUND OF THE INVENTION

1. Field of the Invention

The present invention relates to computer science. More particularly, the present invention relates to fault tolerant client-server environments.

2. Background

Many organizations have a substantial number of computers in operation, often located far apart. For example, a company with many factories may have a computer at each location to keep track of inventories, monitor productivity and do the local payroll. Connecting these computers via a network enables resource sharing by making all programs, equipment and especially data available to anyone on the network without regard to the physical location of the resource and the user.

Reducing the cost of computing is important. Small computers have a much better price/performance ratio than large ones. Mainframes are much faster than personal computers, but they cost significantly more. This imbalance has caused many systems designers to build systems consisting of personal computers, one per user, with data kept on one or more shared file server machines. In this case, the users are the clients, and this type of arrangement is referred to as a client-server architecture.

Figure 1:
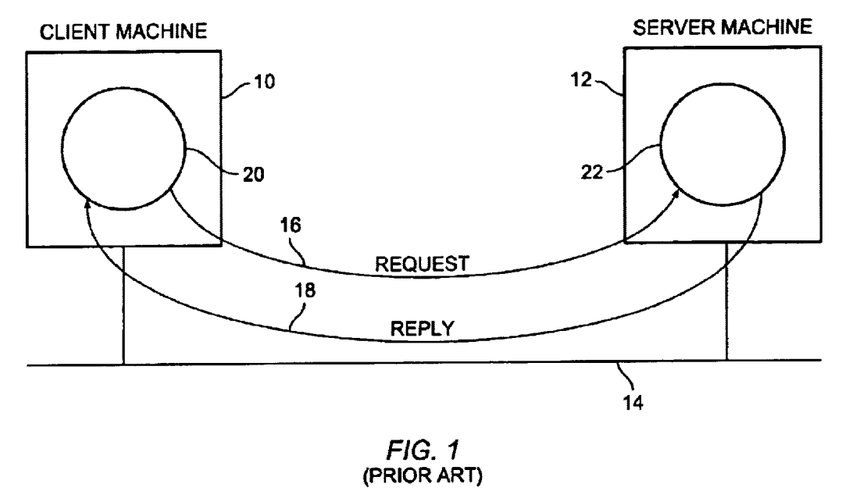
FIG. 1 is a block diagram that illustrates a client-server architecture.

Turning now to FIG. 1, a block diagram that illustrates a typical client-server architecture is presented. Client 10 is connected to a server 12 via bus 14. Communication typically takes the form of a request message 16 from the client 10 to the server 12 asking for some work to be done. The server 12 then does the work and sends back a reply message 18. Typically, there are relatively many clients using a relatively small number of servers.

Reliability and availability are important features in client-server computing environments. Computer networks increase reliability by having alternate sources of supply. For example, all files may be replicated on multiple machines, so if one of them is unavailable (due to hardware failure or communication failure), the other copies may be used. In addition, the presence of multiple processors means that if the performance of a particular processor degrades sufficiently, the other processors may be able to take over at least a portion of its work.

Reliability and availability are especially important for applications that perform critical transactions. Such applications include military, banking, air traffic control, nuclear reactor safety and many other applications. In these cases, the ability to continue operating in the face of hardware or communication problems is of utmost importance. Servers in these systems typically must be fault tolerant. For instance, if the primary server is functioning poorly or not at all due to a heavy workload or network problems, a backup or secondary server may be invoked to assume the server workload, thus allowing critical transactions to continue without undesirable interruption.

Typically, the client in a fault tolerant system detects an improperly functioning server by monitoring communications between the client and the server. One typical fault tolerant algorithm requires that the client record each request it sends to the server. The client stores a specific number of recent requests into a buffer and relates any reply received to its respective request. This method requires a mechanism to uniquely identify each request and each reply. Typically, a separate task is activated periodically to check the delays and reply-request ratio, which is the number of replies received from the server divided by the number of requests sent to the server. If replies are received with large delays, or if the reply-request ratio is too small, deteriorating server performance is indicated.

This method of logging messages and associating each reply with a specific request increases the complexity and memory requirements of fault tolerant systems. This problem is exacerbated in modern client-server systems in which a single client is connected to many servers, requiring separate fault tolerant checks for each client-server connection.

Accordingly, a need exists in the prior art for a method and apparatus for a robust fault tolerant client-server system that requires relatively little processor and memory overhead.

BRIEF DESCRIPTION OF THE INVENTION

A method for determining the performance of a first processor in a computer network in which the first processor is connected to a second processor includes incrementing a request count when the second processor requests data from the first processor, incrementing a reply count when the second processor receives data from the first processor, dividing the reply count by the request count to create a ratio and indicating the performance of the first processor is less than expected when the ratio is less than a threshold. An apparatus for determining the performance of a first processor includes at least one memory having program instructions and at least one processor coupled to the first processor. The at least one processor is configured to increment a request count when the at least one processor requests data from the first processor, determine the performance of the first processor based upon a reply count and the request count and increment the reply count when the second processor receives data from the first processor.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to computer science. More particularly, the present invention relates to fault tolerant client-server environments. The invention further relates to machine readable media on which are stored (1) the layout parameters of the, present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to the present invention, a client in a client-server system monitors server performance. One counter maintains the number of requests made to the server. Another counter maintains the number of replies received from the server. These counters are increased whenever a request is sent to the server or whenever the client receives a reply. The server performance is determined by comparing a reply-request ratio with a predefined minimum ratio. The reply-request ratio is the number of replies received from the server, divided by the number of requests sent to the server. If the reply-request ratio is less than the minimum ratio, an indication that server performance is less than expected is made. The client may use this information to determine what, if any, corrective actions should be taken. The corrective actions may include switching over to a secondary or backup server.

Figure 2:
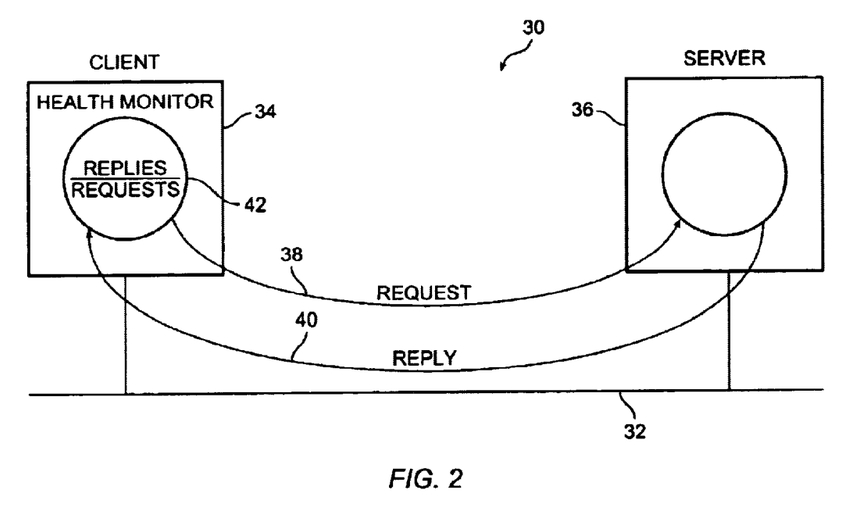
FIG. 2 is a block diagram that illustrates a computer network according to one embodiment of the present invention.

Turning now to FIG. 2, a block diagram that illustrates a computer network according to one embodiment of the present invention is illustrated. The computer network 30 comprises a bus 32, at least one client 34 and at least one server 36. In operation, client 34 sends a request message 38 from client 34 to server 36. Server 36 receives the request message 38 and sends a reply message 40 from server 36 to client 34. A performance monitor 42 maintains a count of the number of request messages sent to server 36 and a count of the number of reply messages received from server 36. When the ratio of replies to requests falls below a predetermined threshold, an indication that the server 36 performance is less than expected is made. When an indication that server 36 performance is less than expected is made, corrective measures may be implemented. For example, a backup server may be brought online.

The illustration of a client-server system having only one server and one client is not intended to be limiting in any way. Those of ordinary skill in the art will recognize that the invention may be applied to client-server systems including multiple clients and servers. Furthermore, the invention may be used in client-server systems in which a single client communicates with multiple servers.

Figure 3A:
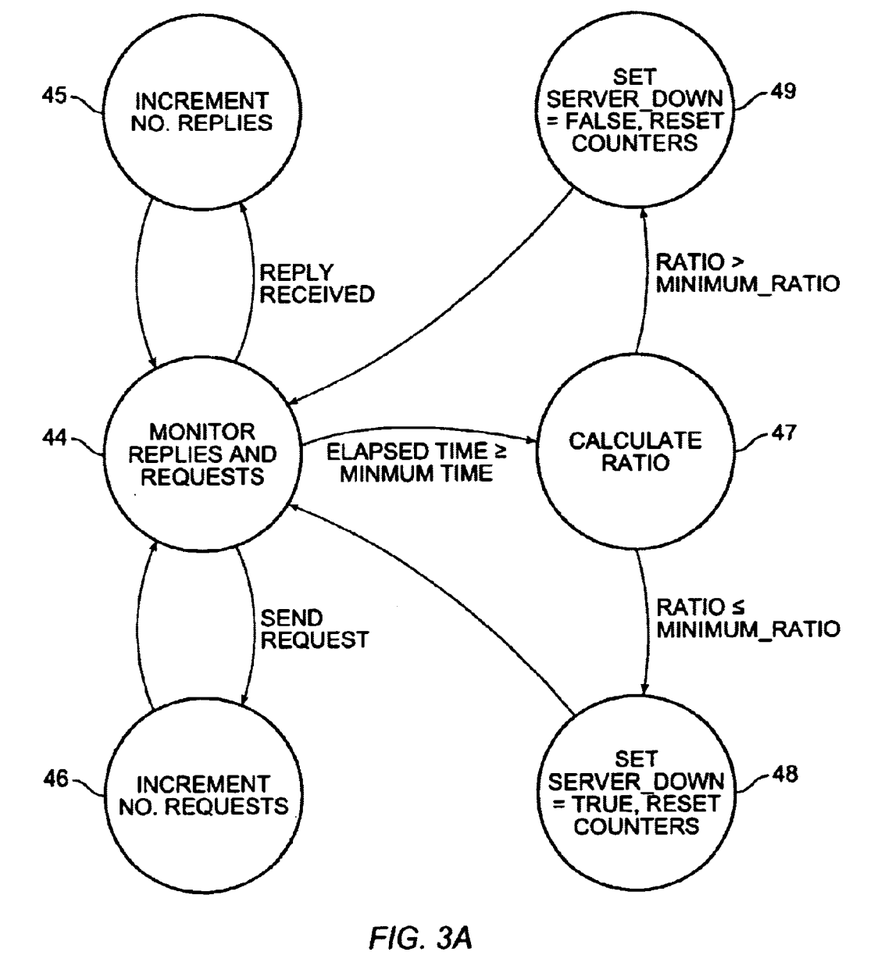
FIG. 3A is a state diagram that illustrates a method for determining the performance of a server in accordance with one embodiment of the present invention.

Turning now to FIG. 3A, a state diagram that illustrates a method for determining the performance of a server in accordance with one embodiment of the present invention is presented. In state 44, send requests and the receipt of replies are monitored. When a reply is received, a reply count is incremented in state 45. When a send request is pending, a request count is incremented in state 46. After a minimum time has elapsed, the system transitions to state 47 and a reply-request ratio is calculated by dividing the reply count by the request count. If the ratio is less than or equal to a minimum ratio, the variable "Server_Down" is set to "True" in state 48, indicating that the server 36 performance is less than expected. If the ratio is greater than the minimum ratio, the variable "Server_Down" is set to "False" in state 49, indicating that the server 36 performance is acceptable. After setting the "Server_Down" variable in states 48 and 49, the request count and the reply count are reset to their initial values and the system moves back to state 44 and monitors replies and requests.

According to one embodiment of the present invention, separate tasks are employed to perform the activities represented by states 44–46 and states 47–49, thus allowing the monitoring activities and the reply-request ratio calculation to proceed in parallel.

Figure 3B:
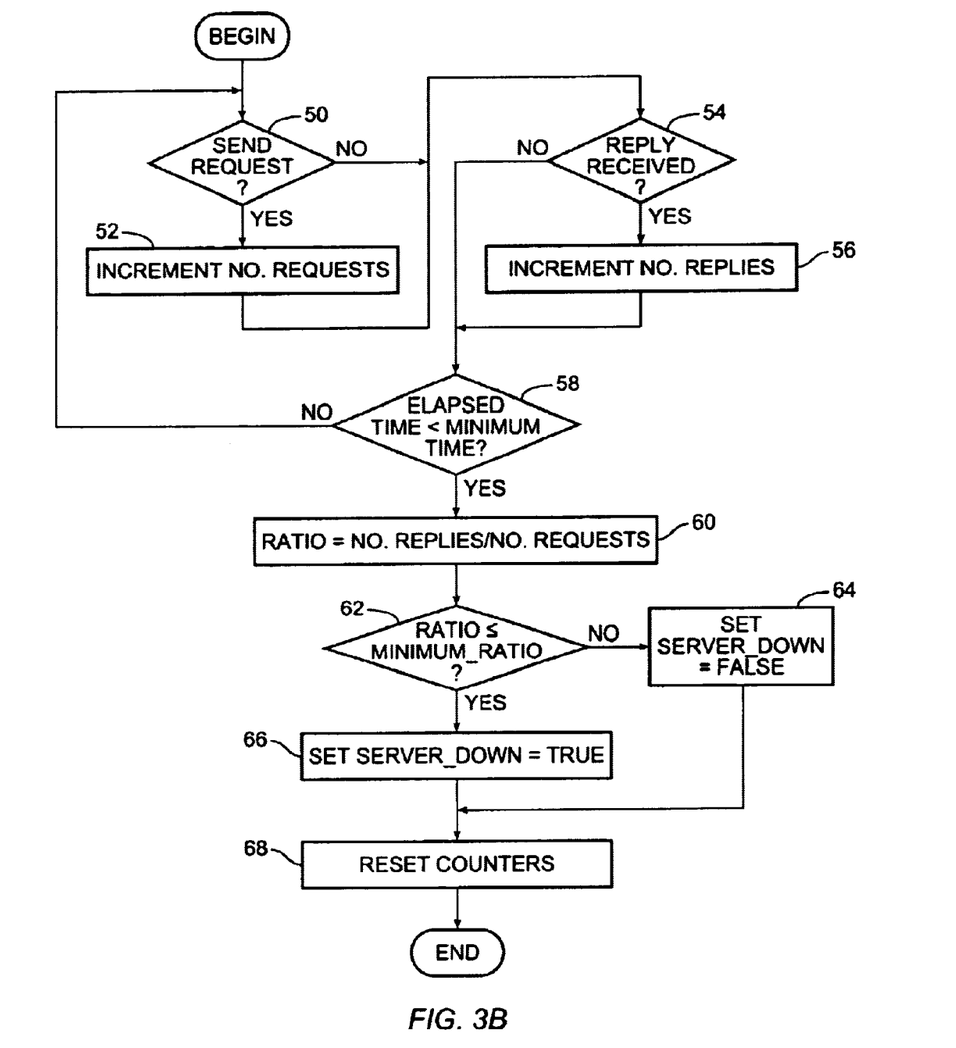
FIG. 3B is a flow diagram that illustrates a method for determining the performance of a server in accordance with one embodiment of the present invention.

Turning now to FIG. 3B, a flow diagram that illustrates a method for determining the performance of a server in accordance with one embodiment of the present invention is presented. At reference numeral 50, a determination is made regarding whether a send request is pending. If a send request is pending, a request count is incremented at reference numeral 52. At reference numeral 54, a determination is made regarding whether a reply from server 36 has been received. If a reply has been received, a reply count is incremented at reference numeral 56.

At reference numeral 58, a determination is made regarding whether the amount of time elapsed since the last reply-request ratio calculation is less than or equal to a minimum time. If not enough time has elapsed, execution continues at reference numeral 50. If enough time has elapsed since the last reply-request ratio calculation, a reply-request ratio is calculated by dividing the reply count by the request count at reference numeral 60. At reference numeral 62, a determination is made regarding whether the reply-request ratio is less than or equal to a minimum reply-request ratio. If the ratio greater than the minimum reply-request ratio, the variable "Server_Down" is set to "False" at reference numeral 64, indicating that the server 36 performance is acceptable. If the ratio is less than or equal to the minimum reply-request ratio, the variable "Server_Down" is set to "True" at reference numeral 66, indicating that server 36 performance is less than expected. At reference numeral 68, the reply count and request count are reset to their initial values.

Figure 4:
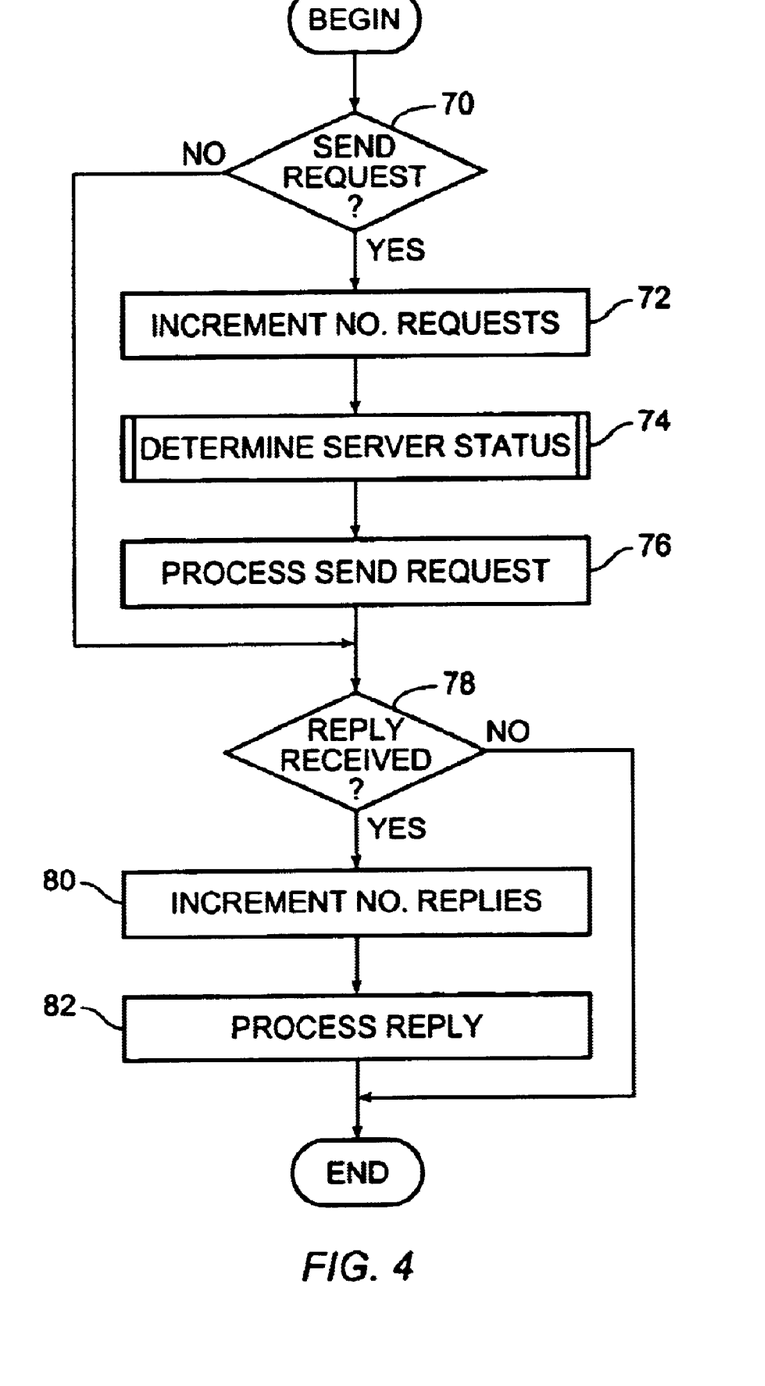
FIG. 4 is a flow diagram that illustrates a method for determining the performance of a server in accordance with one embodiment of the present invention.

According to one embodiment of the present invention, the server status is determined when the client is about to send a request to the server. This is illustrated in FIG. 4. Turning now to FIG. 4, a flow diagram that illustrates one embodiment of the present invention is presented. At reference numeral 70, a determination is made regarding whether a send request is pending. If a send request is pending, a request count is incremented at reference numeral 72. At reference numeral 74, a determination regarding whether server 36 performance is less than expected is made. At reference numeral 76, the send request is processed. If a send request is not pending, a determination is made regarding whether a reply from server 36 has been received at. reference numeral 78. If a reply has been received, a reply count is incremented at reference numeral 80 and the reply message is processed at reference numeral 82.

According to one embodiment of the present invention, the reply-request ratio is calculated only when the request count has exceeded a minimum number of requests. Varying the minimum number of requests may modify the accuracy of the reply-request ratio. A relatively large minimum number of requests will increase the sample size and thus provide a relatively accurate reply-request ratio.

Figure 5:
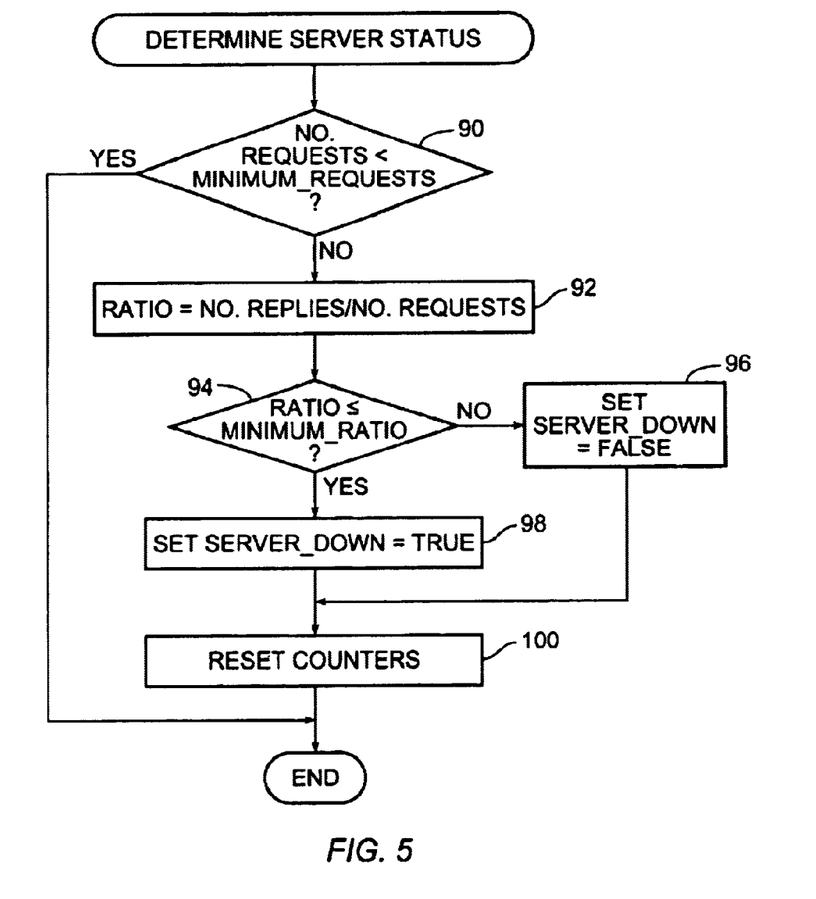
FIG. 5 is a flow diagram that illustrates a method for determining a server status in accordance with one embodiment of the present invention.

Turning now to FIG. 5, a flow diagram that illustrates determining the server status in accordance with one embodiment of the present invention is presented. At reference numeral 90, a determination is made regarding whether the request count is less than a minimum number of requests. If the request count is greater than or equal to the minimum number of requests, a reply-request ratio is calculated by dividing the reply count by the request count at reference numeral 92. At reference numeral 94, a determination is made regarding whether the reply-request ratio is less than or equal to a minimum reply-request ratio. If the ratio is greater than the minimum reply-request ratio, the variable "Server_Down" is set to "False" at reference numeral 96, indicating that server 36 performance is acceptable. If the ratio is less than or equal to the minimum reply-request ratio, the variable "Server_Down" is set to "True" at reference numeral 98, indicating that server 36 performance is less than expected. At reference numeral 100, the reply count and request count are reset to their initial values in preparation for the next reply-request ratio calculation.

According to one embodiment of the present invention, the reply-request ratio is calculated only when a predetermined amount of time has elapsed since the last time the reply-request ratio was calculated. Varying the predetermined amount of time may modify the accuracy of the reply-request ratio. A relatively large predetermined amount of time will provide a relatively accurate reply-request ratio.

Figure 6:
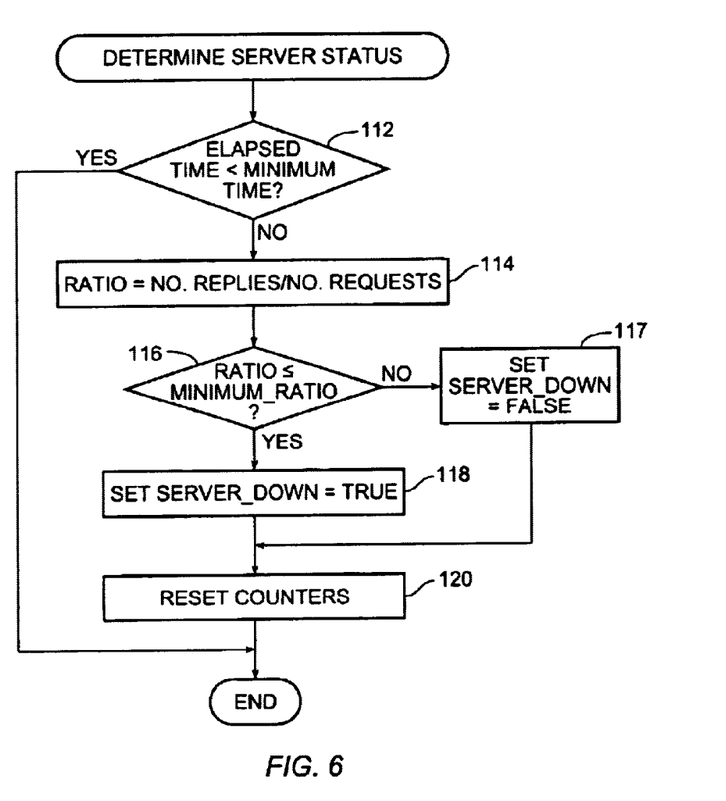
FIG. 6 is a flow diagram that illustrates a method for determining a server status in accordance with one embodiment of the present invention.

Turning now to FIG. 6, a flow diagram that illustrates determining the server status in accordance with one embodiment of the present invention is presented. At reference numeral 112, a determination is made regarding whether a predetermined time has elapsed. If the predetermined time has elapsed, a reply-request ratio is calculated by dividing the reply count by the request count at reference numeral 114. At reference numeral 116, a determination is made regarding whether the reply-request ratio is less than or equal to a minimum reply-request ratio. If the ratio is greater than the minimum reply-request ratio, the variable "Server_Down" is set to "False" at reference numeral 117, indicating that server 36 performance is acceptable. If the ratio is less than or equal to the minimum reply-request ratio, the variable "Server_Down" is set to "True" at reference numeral 118, indicating that server 36 performance is less than expected. At reference numeral 120, the reply count and request count are reset to their initial values.

Requests are typically sent at random intervals and replies are received at random intervals. It is therefore possible that the reply-request ratio is calculated at a point immediately after several requests are sent out in a short period, but before most of the replies are received, as illustrated in FIG. 7.

Figure 7:
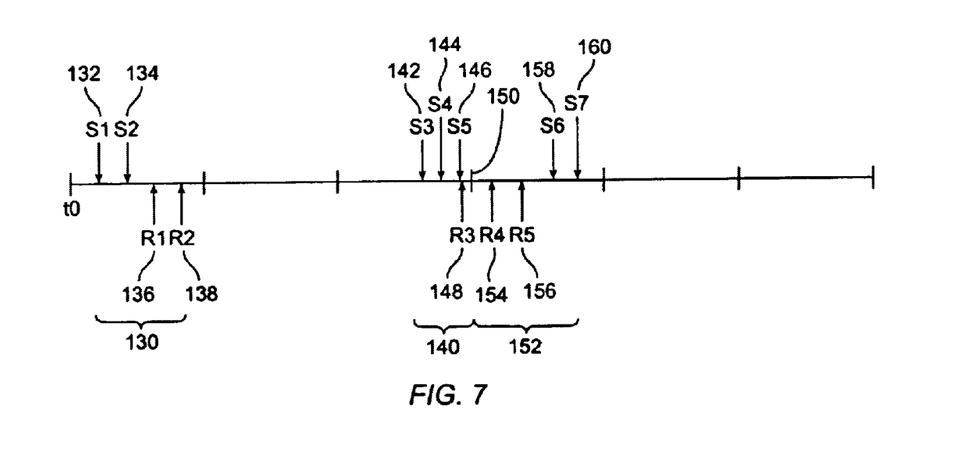
FIG. 7 is a block diagram that illustrates the timing relationship of send and receive messages.

Turning now to FIG. 7, a block diagram that illustrates the timing relationship of send and receive messages is presented. In time period 130, requests 132 and 134 are sent to the server and replies 136 and 138 are received from the server, making the reply-request ratio equal to the value one. In time period 140, requests 142, 144 and 146 are sent to the server 36 and reply 148 is received from the server 36 immediately before the reply-request ratio is calculated at reference numeral 150. In this case, the reply-request ratio is 1/3 (one reply for every three requests).

In time period 152, replies 154 and 156 are received and requests 158 and 160 are sent, making the reply-request ratio equal to the value one. Thus, basing the server 36 status on a reply-request ratio calculated at reference numeral 150 could lead to a false indication of a poorly performing server and could thus unnecessarily trigger corrective action. According to one embodiment of the present invention, an indication that server 36 performance is less than expected is made only after the reply-request ratio is less than or equal to a minimum reply-request ratio for a predetermined number of consecutive reply-request ratio calculations. According to a preferred embodiment of the present invention, the predetermined number of consecutive reply-request ratio calculations is two.

Figure 8:
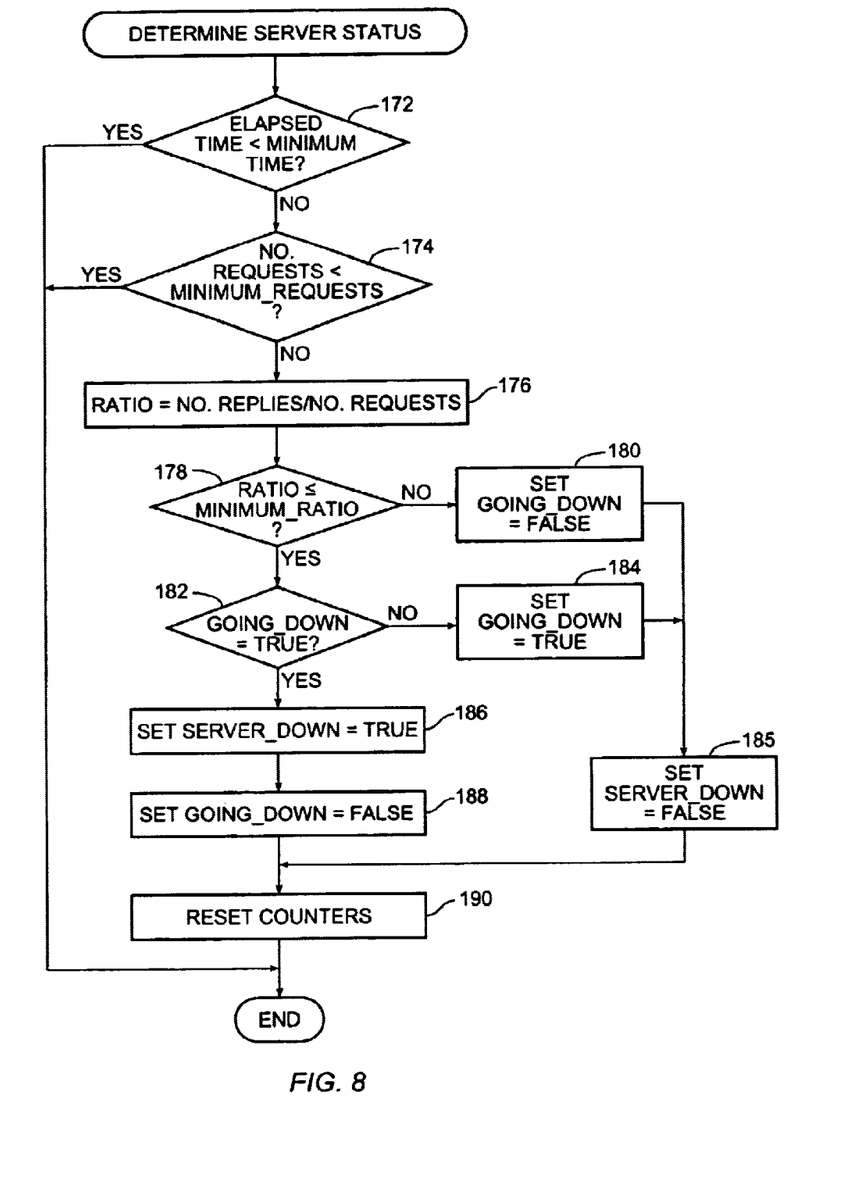
FIG. 8 is a flow diagram that illustrates a method for determining a server status in accordance with one embodiment of the present invention.

Turning now to FIG. 8, a flow diagram that illustrates determining the server status in accordance with one embodiment of the present invention is presented. At reference numeral 172, a determination is made regarding whether a predetermined time has elapsed. At reference numeral 174, a determination is made regarding whether the request count is less than a minimum number of requests. If the predetermined time has elapsed and if the request count is greater than or equal to a minimum request count, a reply-request ratio is calculated at reference numeral 176. At reference numeral 178, a determination is made regarding whether the reply-request ratio is less than or equal to a minimum reply-request ratio. If the ratio is greater than the minimum reply-request ratio, a variable "Going_Down" is set to "False" at reference numeral 180, indicating that the server reply-request ratio should not be checked again in a second consecutive period.

If the reply-request ratio of the current period is less than or equal to the minimum ratio, the value of the variable "Going_Down" is checked at reference numeral 182.

The variable "Going_Down" indicates whether the reply-request ratio of the previous period is less than or equal to the minimum ratio. If "Going_Down" is "True", the variable "Server_Down" is set to "True" at reference numeral 186, indicating that the server 36 performance is less than expected. At reference numeral 188, the variable "Going_Down" is set to "False", indicating that the server 36 performance should not be checked again in a second consecutive period. If the value of the variable "Going_Down" is "False" at reference numeral 182, the variable "Going_Down" is set to "True" at reference numeral 184, indicating that the server 36 performance should be checked again in a second consecutive period.

If the reply-request ratio of the current period is greater than the minimum ratio at reference numeral 178, or if the reply-request ratio of the previous period is greater than the minimum ratio at reference numeral 182, the variable "Server_Down" is set to "False" at reference numeral 185, indicating that the server 36 performance is acceptable. At reference numeral 190, the reply count and request count are reset to their initial values in preparation for the next reply-request ratio calculation The above embodiment thus extends the amount of time required to detect a poorly performing server 36. However, false detections are made less likely because the replies that were excluded from an earlier reply-request calculation are more likely to be received before the final reply-request ratio calculation, thus resulting in a final reply-request ratio that is greater than the minimum ratio.

In the embodiments described herein, the use of counters that are incremented in the positive direction by a particular number until a criterion is met is not intended to be limiting in any way. Those of ordinary skill in the art will recognize that many counting schemes are applicable as well. For example, counters that are decremented in the negative direction by a number until a criterion is met could be employed.

According to a presently preferred embodiment, the present invention may be implemented in software or firmware, as well as in programmable gate array devices, Application Specific Integrated Circuits (ASICs), and other hardware.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for determining the performance of a first processor in a computer network, said first processor operatively coupled to a second processor, the method comprising:

incrementing a request count when said second processor requests data from said first processor, said request count indicating a total number of requests from a last reset of said request count;

incrementing a reply count when said second processor receives data from said first processor, said reply count indicating a total number of replies from a last reset of said reply count;

dividing said reply count by said request count to create a ratio; and indicating the performance of said first processor is less ten than expected when said ratio is less than a threshold.

2. The method of claim 1, further comprising resetting said reply count and said request count after said dividing.

3. A method for determining the performance of a first processor in a computer network, said first processor operatively coupled to a second processor, the method comprising:

incrementing a request count when said second processor requests data from said first processor, said request count indicating a total number of requests from a last reset of said request count;

determining the performance of said first processor based upon a reply count and said request count, said reply count indicating a total number of replies from a last reset of said reply count; and incrementing said reply count when said second processor receives data from said first processor.

4. The method of claim 3 wherein said determining the performance of said first processor further comprises:

dividing said reply count by said request count to create a ratio when said request count is less than a minimum request count; and indicating the performance of said first processor is less than expected when said ratio is less than a minimum ratio.

5. The method of claim 4, further comprising resetting said reply count and said request count after said determining the performance of said first processor.

6. The method of claim 3 wherein said determining the performance of said first processor further comprises:

dividing said reply count by said request count to create a ratio after a predetermined time; and indicating the performance of said first processor is less than expected when said ratio is less than a minimum ratio.

7. The method of claim 6, further comprising resetting said reply count and said request count after said determining the performance of said first processor.

8. The method of claim 7 wherein said predetermined time further comprises a minimum time between consecutive ratio calculations.

9. The method of claim 3 wherein said determining the performance of said first processor further comprises:

dividing said reply count by said request count to create a ratio when a predetermined time has elapsed and when said request count is greater than or equal to a minimum request count;

clearing a first indication when said ratio is greater than said minimum ratio;

setting said first indication when said ratio is less than or equal to said minimum ratio and when said first indication is cleared; and indicating the performance of said first processor is less than expected when said ratio is less than or equal to said minimum ratio and when said first indication is set.

10. The method of claim 9, further comprising resetting said reply count and said request count after said determining the performance of said first processor.

11. The method of claim 10 wherein said predetermined time further comprises a minimum time between consecutive ratio calculations.

12. The method of claim 3 wherein said determining the performance of said first processor further comprises:

dividing said reply count by said request count to create a ratio when a predetermined time has elapsed and when said request count is greater than or equal to a minimum request count; and indicating the performance of said first processor is less than expected when said ratio is less than or equal to a minimum ratio for a predetermined number of consecutive ratio calculations.

13. The method of claim 12, further comprising resetting said reply count and said request count after said determining the performance of said first processor.

14. The method of claim 13 wherein said predetermined time further comprises a minimum time between consecutive ratio calculations.

15. A program storage device readable by a machine, tangibly embodying a program of instructions executable by the machine to perform a method for determining the performance of a first processor, the method comprising:

incrementing a request count when said second processor requests data from said first processor, said request count indicating a total number of requests from a last reset of said request count;

determining the performance of said first processor based upon a reply count and said request count, said reply count indicating a total number of replies from a last reset of said reply count; and incrementing a reply count when said second processor receives data from said first processor.

16. The program storage device of claim 15 wherein said determining the performance of said first processor further comprises:

dividing said reply count by said request count to create a ratio when said request count is greater than or equal to a minimum request count; and indicating the performance of said first processor is less than expected when said ratio is less than a minimum ratio.

17. The program storage device of claim 16, said method further comprising resetting said reply count and said request count after said determining the performance of said first processor.

18. The program storage device of claim 15 wherein said determining the performance of said first processor further comprises:
   dividing said reply count by said request count to create a ratio after a predetermined time; and
   indicating the performance of said first processor is less than expected when said ratio is less than a minimum ratio.

19. The program storage device of claim 18, said method further comprising resetting said reply count and said request count after said determining the performance of said first processor.

20. The program storage device of claim 19 wherein said predetermined time further comprises a minimum time between consecutive ratio calculations.

21. The program storage device of claim 15 wherein said determining the performance of said first processor further comprises:
   dividing said reply count by said request count to create a ratio when a predetermined time has elapsed and when said request count is greater than or equal to a minimum request count;
   clearing a first indication when said ratio is less than or equal to said minimum ratio;
   setting said first indication when said ratio is less than or equal to said minimum ratio and when said first indication is cleared; and
   indicating the performance of said first processor is less than expected when said ratio is less than or equal to said minimum ratio and when said first indication is set.

22. The program storage device of claim 21, said method further comprising resetting said reply count and said request count after said determining the performance of said first processor.

23. The program storage device of claim 22 wherein said predetermined time further comprises a minimum time between consecutive ratio calculations.

24. The program storage device of claim 15 wherein said determining the performance of said first processor further comprises:
   dividing said reply count by said request count to create a ratio when a predetermined time has elapsed and when said request count is greater than or equal to a minimum request count; and
   indicating the performance of said first processor is less than expected when ratio is less than or equal to a minimum ratio for a predetermined number of consecutive ratio calculations.

25. The program storage device of claim 24, said method further comprising resetting said reply count and said request count after said determining the performance of said first processor.

26. The program storage device of claim 25 wherein said predetermined time further comprises a minimum time between consecutive ratio calculations.

27. An performance monitor for determining the performance of a first processor, comprising:
   at least one memory having program instructions; and
   at least one processor operatively coupled to said first processor and configured to use the program instructions to:
   increment a request count when said at least one processor requests data from said first processor, said request count indicating a total number of requests from a last reset of said request count;
   determine the performance of said first processor based upon a reply count and said request count, said reply count indicating a total number of replies from a last reset of said reply count; and
   increment said reply count when said second processor receives data from said first processor.

28. A fault tolerant computer network, comprising:
   a bus;
   a first processor coupled to said bus; and
   a second processor coupled to said bus, said second processor comprising a performance monitor, said performance monitor configured to:
   increment a request count when said second processor requests data from said first processor, said request count indicating a total number of requests from a last reset of said request count;
   determine the performance of said first processor based upon a reply count and said request count, said reply count indicating a total number of replies from a last reset of said reply count; and
   increment said reply count when said second processor receives data from said first processor.

29. The apparatus of claim 27 wherein said performance monitor is further configured to determine the performance of said first processor by:
   dividing said reply count by said request count to create a ratio when said request count is greater than or equal to a minimum request count; and
   indicating the performance of said first processor is less than expected when said ratio is less than a minimum ratio.

30. The apparatus of claim 29, said performance monitor further configured to reset said reply count and said request count after said determining the performance of said first processor.

31. The apparatus of claim 27, said performance monitor further configured to determine the performance of said first processor by:
   dividing said reply count by said request count to create a ratio after a predetermined time; and
   indicating the performance of said first processor is less than expected when said ratio is less than a minimum ratio.

32. The apparatus of claim 31, said performance monitor further configured to reset said reply count and said request count after said determining the performance of said first processor.

33. The apparatus of claim 32 wherein said predetermined time further comprises a minimum time between consecutive ratio calculations.

34. The apparatus of claim 27 wherein said performance monitor is further configured to determine the performance of said first processor by:
   dividing said reply count by said request count to create a ratio when a predetermined time has elapsed and when said request count is greater than or equal to a minimum request count;
   clearing a first indication when said ratio is greater than said minimum ratio;
   setting said first indication when said ratio is less than or equal to said minimum ratio and when said first indication is cleared; and indicating the performance of said first processor is less than expected when said ratio is less than or equal to said minimum ratio and when said first indication is set.

35. The apparatus of claim 34, said performance monitor further configured to reset said reply count and said request count after said determining the performance of said first processor.

36. The apparatus of claim 35 wherein said predetermined time further comprises a minimum time between consecutive ratio calculations.

37. The apparatus of claim 27 wherein said performance monitor is further configured to determine the performance of said first processor by:

dividing said reply count by said request count to create a ratio when a predetermined time has elapsed and when said request count is greater than or equal to a minimum request count; and indicating the performance of said first processor is less than expected when said ratio is less than or equal to a minimum ratio for a predetermined number of consecutive ratio calculations.

38. The apparatus of claim 37, said performance monitor further configured to reset said reply count and said request count after said determining the performance of said first processor.

39. The apparatus of claim 38 wherein said predetermined time further comprises a minimum time between consecutive ratio calculations.

40. A method for determining the performance of a first processor in a computer network, said first processor operatively coupled to a second processor, the method comprising:

incrementing a request count when said second processor requests data from said first processor, said request count indicating a total number of requests from a last reset of said request count;

incrementing a reply count when said second processor receives data from said first processor, said reply count indicating a total number of replies from a last reset of said reply count;

carrying out a mathematical operation on said reply count and said request count to obtain a ratio; and evaluating the performance of said first processor based upon said ratio.

41. The method of claim 40, further comprising resetting said reply count and said request count after said carrying out.

42. The method of claim 40, wherein said carrying out further comprises carrying out said mathematical operation after a predetermined time.

43. The method of claim 42, wherein said predetermined time further comprises a minimum time between consecutive ratio mathematical operations.

44. A program storage device readable by a machine, tangibly embodying a program of instructions readable by the machine to perform a method for determining the performance of a first processor in a computer network, said first processor operatively coupled to a second processor, the method comprising:

incrementing a request count when said second processor requests data from said first processor, said request count indicating a total number of requests from a last reset of said request count;

incrementing a reply count when said second processor receives data from said first processor, said reply count indicating a total number of replies from a last reset of said reply count;

carrying out a mathematical operation on said reply count and said request count to obtain a ratio; and evaluating the performance of said first processor based upon said ratio.

45. The program storage device of claim 44, said method further comprising resetting said reply count and said request count after said carrying out.

46. The program storage device of claim 44, wherein said carrying out further comprises carrying out said mathematical operation after a predetermined time.

47. The program storage device of claim 46, wherein said predetermined time further comprises a minimum time between consecutive ratio mathematical operations.

48. An apparatus for determining the performance of a first processor in a computer network, said first processor operatively coupled to a second processor, the apparatus comprising:

means for incrementing a request count when said second processor requests data from said first processor, said request count indicating a total number of requests from a last reset of said request count;

means for incrementing a reply count when said second processor receives data from said first processor, said reply count indicating a total number of replies from a last reset of said reply count;

means for carrying out a mathematical operation on said reply count and said request count to obtain a ratio; and means for evaluating the performance of said first processor based upon said ratio.

49. The apparatus of claim 48, further comprising means for resetting said reply count and said request count after said carrying out.

50. The apparatus of claim 48, wherein said means for carrying out further comprises means for carrying out said mathematical operation after a predetermined time.

51. The apparatus of claim 50, wherein said predetermined time further comprises a minimum time between consecutive ratio mathematical operations.

* * * * *

UNITED STATES PATENT AND TRADEMARK OFFICE
CERTIFICATE OF CORRECTION

PATENT NO. : 6,718,282 B1
DATED : April 6, 2004
INVENTOR(S) : Xi Xu, Shuxian Lou, Shujin Zhang

It is certified that error appears in the above-identified patent and that said Letters Patent is hereby corrected as shown below:

Column 7,
Line 32, replace "ten" with -- than --.

Column 9,
Line 61, replace "performance monitor" with -- apparatus --.

Signed and Sealed this

Thirty-first Day of August, 2004

JON W. DUDAS
*Director of the United States Patent and Trademark Office*